US006701718B1

(12) United States Patent (10) Patent No.: US 6,701,718 B1
Pisciotta (45) Date of Patent: Mar. 9, 2004

(54) HEAT EXCHANGING APPARATUS FOR HANDLING AND TRANSPORTING VESSELS

(75) Inventor: John M. Pisciotta, Tampa, FL (US)

(73) Assignee: University of South Florida, Tampa, FL (US)

( * ) Notice: Subject to any disclaimer, the term of this patent is extended or adjusted under 35 U.S.C. 154(b) by 14 days.

(21) Appl. No.: 10/063,396

(22) Filed: Apr. 18, 2002

Related U.S. Application Data

(60) Provisional application No. 60/284,641, filed on Apr. 18, 2001.

(51) Int. Cl.[7] .................... F25B 21/02; F25D 3/00; A47J 27/58

(52) U.S. Cl. .................... 62/3.3; 62/372; 62/457.8; 62/457.4; 126/383.1; 126/386.1

(58) Field of Search .................... 62/3.3, 372, 457.8, 62/457.4; 126/383.1, 386.1

(56) References Cited

U.S. PATENT DOCUMENTS 735,403 A * 8/1903 Osborne .................... 62/457.8
1,671,531 A * 5/1928 Kuhl .................... 62/457.8
3,553,976 A * 1/1971 Cumine et al. .................... 62/294
3,757,852 A * 9/1973 Allinger .................... 165/47
4,157,707 A 6/1979 Schwind et al.
4,283,925 A * 8/1981 Wildfeuer .................... 62/434
4,377,076 A * 3/1983 Staudt et al. .................... 62/395
4,682,472 A * 7/1987 Huard .................... 62/3.3
4,711,099 A * 12/1987 Polan et al. .................... 62/457.4
4,823,554 A * 4/1989 Trachtenberg et al. ........ 62/3.3
5,007,248 A * 4/1991 Maier et al. .................... 62/244
5,033,453 A * 7/1991 Loyd et al. .................... 126/377.1
5,048,307 A * 9/1991 Baxter .................... 62/457.4
5,125,243 A * 6/1992 Zorea et al. .................... 62/446
6,018,961 A * 2/2000 Venture et al. .................... 62/434
6,176,100 B1 * 1/2001 Kremesec et al. .......... 62/457.3
6,330,808 B1 12/2001 Kouwenberg et al.
6,381,981 B1 * 5/2002 Yaddgo et al. .................... 62/372
6,434,955 B1 * 8/2002 Ng et al. .................... 62/106
6,474,093 B1 * 11/2002 Fink et al. .................... 62/434

* cited by examiner

*Primary Examiner*—William C. Doerrler
*Assistant Examiner*—Filip Zec
(74) *Attorney, Agent, or Firm*—Smith & Hopen, P.A.; Molly L. Sauter

(57) ABSTRACT

The present invention is a heat-exchanging apparatus that also serves as a handler-transporter of media-containing vessels. The heat-exchanging apparatus is composed of a flexible, holow tube that is generally in the shape of a coil, which allows for the flow of liquid therein. There is an insulated gripping means for covering the handle of the flexible, hollow tube's first end and second end to prevent contact with hot or cold temperatures when the present invention is handled or transported. In addition, the flexible, hollow tube is connected to two flexible, heat-insulated tubes. The flexible, heat-insulating tubes are connected to a fluid dispenser and a reservoir to provide a channel for in-coming fluid and out-going fluid. Also, to allow for secure and safe handling/transporting of media-containing vessel, the first and second ends of the flexible, hollow tubes are held together by a locking means.

38 Claims, 10 Drawing Sheets

HEAT EXCHANGING APPARATUS FOR HANDLING AND TRANSPORTING VESSELS

This application is based on priority Provisional Application Ser. No. 60/284,641 filed Apr. 18, 2001, of which the following specification is a Continuation-in-Part.

BACKGROUND OF THE INVENTION

1. Related Applications

2. Field of Invention

The invention relates generally to heating and cooling a media-containing vessel and handling or transporting the vessel. The present invention covers the fields of heat-exchanging devices and handling-transporting devices. First, the present invention provides a heat-exchanging means for cooling or heating fluids contained in a vessel. Second, the present invention provides a handling-transporting mechanism, with a locking means, to safely and quickly transport a cooled or heated vessel and its contents therein, without incorporating additional equipment.

BACKGROUND OF THE INVENTION

In industry, growth media have been known for decades and are used in laboratories and research facilities through the world. These are made by mixing a specified amount of dehydrated growth media with a set volume of water. To completely dissolve the media, the growth media is typically mixed as it boils. This can be performed on a composite hot plate with a magnetic stirrer where a metallic stir-bar inside the flask follows the magnetic guide of rotating magnet housed within the hot-plate base. After boiling, the media is typically sterilized by autoclaving the media-containing vessel at 121 degrees Celsius for a minimum of fifteen (15) minutes.

After the flask has been removed from the autoclave, it is still too hot to handle directly. Furthermore, because media are generally created in large volumes (500 ml–2 L), it often takes a fair amount of time for the media-containing vessel and media therein to cool sufficiently to allow for handling or transporting. In addition, temperature-sensitive agents, such as antibiotics, virions, and enzymes, cannot be added while the vessel is still hot. Because the introduction of a thermometer into the liquid media can cause contamination, most people simply judge by feeling the outer glass surface of the vessel to determine when the vessel has sufficiently cooled to allow for handling and transporting.

The problems associated with a lack of a heat-exchanging device are prevalent. First, premature handling or transporting of hot flask's side walls can lead to burns and spills. A person handling or transporting hot media-containing vessels often has to wear bulky oven-mitt like gloves if he needs to pour, for example, the hot solution into Petri dishes before the media begins to solidify. Second, a subjective guess of the temperature of the vessel introduces unwanted experimental variation between batches of solutions. Third, waiting on large volumes of solution to sufficiently cool is time-consuming and uneconomical. Fourth, if the gradual cooling process is compromised, such as placing the hot media-containing vessel in a cold-water bath or refrigerator, the media inside the vessel may solidify non-uniformly on side walls.

Thus, what is needed is a heat-exchanging apparatus that simultaneously serves as a handling-transporting device, which incorporates a quick-release handle and a locking means to transport a media-containing vessel.

It has long been known to use hollow tubes constructed in helical patterns in heat-exchanging devices and as handling-transporting devices simultaneously, without the need of additional equipment. Thus, existing prior art teaches either a helical heat-exchanging means or a handling or transporting means coupled with a locking means, but not a combination.

For example, U.S. Pat. No. 654,358 shows the use of spiral pipes through which liquid passes to be cooled. The apparatus is placed in a cooler or icebox to be cooled as liquid flows from one end to the other. The spiral pipes are located within a container, which prevents the pipes from being used as a handling or transporting means. In addition, the pipes are not compressible to easily and safely expand and contract the pipes to serve as a handling or transporting device.

Another proposal for a heat-exchanging device is set out in U.S. Pat. No. 936,060. That patent discloses an ice-freezer that has a cooling medium composed of cooling coils that provide a passage of brine therein. However, this invention also does not use the cooling coils as a handling-transporting device, in conjunction with its intended purpose of serving as a heat-exchanging device.

In addition, the prior art teaches handling or transporting devices with a releasable spring and locking means. However, their purposes and uses are limited to handling or transporting and do not incorporate the combination of handling-transporting means coupled with a heat-exchanging means.

U.S. Pat. No. 46,235 teaches a device that has snail-shaped clamping ends that are compressed and released by hand pressure. However, the clamp is limited in its uses. It is fairly small and is not designed to fit around vessels. Moreover, the invention does not provide a means for thermo-stabilizing media-containing vessels. Thus, additional equipment is needed for the invention to simultaneously serve as a heat-exchanging device and a handling-transporting device.

SUMMARY OF INVENTION

The present invention provides an ergonomic and safe apparatus by which a media-containing vessel can be cooled or heated at a controlled rate and further allows a means whereby the vessel may also be handled-transported without the need for additional equipment.

The present invention relates to a heat exchanging apparatus with a quick-release handle and a locking means to transport a hot or cold media-containing vessel. This present invention satisfies the needs stated above by simultaneously providing a non-obvious combination of a heat-exchanging device and a handling-transporting device with a quick-release handle for locking means, for a media-containing vessel. A preferred version of the present invention comprises: (1) a flexible, hollow tube generally in the shape of a coil; (2) an insulated, gripping means; (3) two flexible, heat-insulating tubes; and (4) a locking means.

The flexible, hollow tube can be cut to any desired length and adjusted to fit the circumference of the vessel to be cooled or heated and handled or transported. The flexible, hollow tube can be any flexible material; e.g., a metal, such as copper, or a plastic. The insulated gripping means can also be cut to any desired length to fit around the handle to allow for squeezing and holding of the flexible, hollow tube while fitting the present invention over the media-containing vessel to be cooled or heated. The two flexible, heat-insulating tubes should also be cut to desired length to allow for handling or transporting of the vessel from one destination to another. The flexible, heat-insulating tubes are adapted to connect to a source of hot and cold fluids at one end. In use, the flexible, hollow tube is wrapped around the media-vessel to come into contact with the outer surface of the vessel while creating a helical configuration around the circumference of the vessel.

Finally, a locking means is connected to the insulated handle and the opposite end of the flexible, hollow tube to prevent squeezing of the quick-release handle when it is locked. This insures that the apparatus will not be squeezed to cause the flexible, hollow tube to expand and release from the circumference of the media-containing vessel, thus causing the vessel to be dropped unexpectedly.

The heat-exchanging device is engaged when fluid is introduced into the flexible, hollow tube via the flexible, heat-insulating tubes that are connected to a fluid dispenser. As fluid travels through the flexible, hollow tube, in a helical motion around the circumference of the media-containing vessel, the solution within the media-containing vessel is heated or cooled depending on its temperature relative to the fluid traveling through the flexible, hollow tube. By increasing or decreasing the temperature and velocity of the fluid traveling through the flexible, hollow tube, the heating or cooling rate can be controlled. This provides the benefit of maximizing the consistency between batches when thermosensitive agents are adding to the solution and allowing for a high degree of reproducibility between batches.

In an alternative embodiment of the invention, the speed of cooling is maximized by attaching a flask clasp coil to a closed circuit evaporative refrigeration system. The flask clasp serves as the evaporative refrigeration coil pulling heat from the supported flask.

In still another alternative embodiment of the invention, both heating and cooling of the flask may be effected by the utilization of spring-mounted, waterproof, Peltier thermoelectric contact panels. By reversing the polarity of direct current (DC) power, heating or cooling of flask is possible.

BRIEF DESCRIPTIONS OF DRAWINGS

These and other features, aspects, and advantages of the present invention will become better understood with reference to the following description, appended claims, and accompanying drawings where:

DETAILED DESCRIPTION

Below is a detailed description of the preferred embodiments of the present invention with reference to the accompanying drawings.

Figure 1:
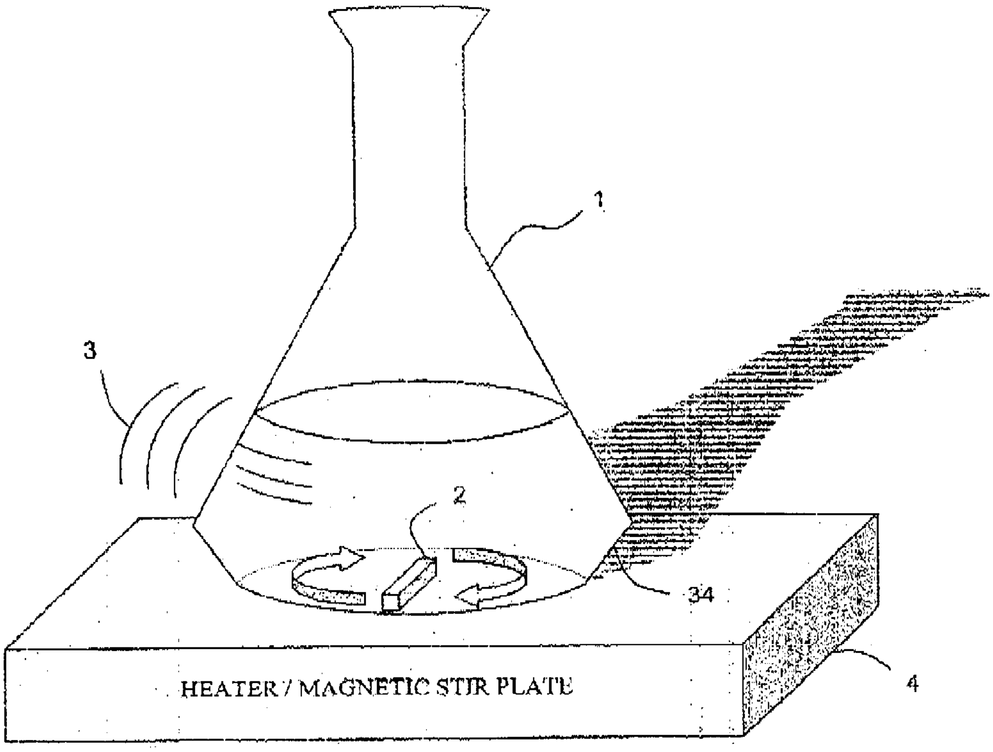
FIG. 1 is a front elevation view of a media-containing vessel, resting on a heater and magnetic stir plate with a magnetic stir bar.
Figure 2:
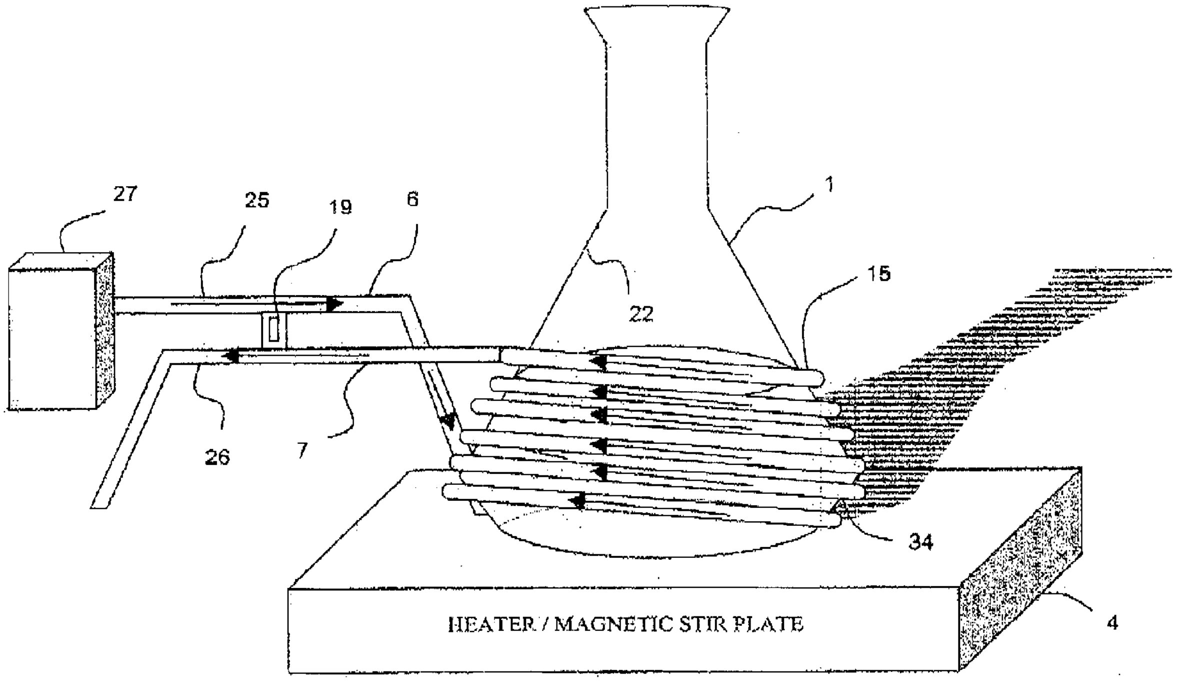
FIG. 2 is the same elevation view as FIG. 1 and includes the flexible, hollow tube, the flexible, heat-insulating tubes, an overflow guard and support handle, and the insulated, gripping means.

The present invention is directed to a heat-exchanging apparatus having quick-release handle 6, 7 and locking means 79, adapted to transport media-containing vessel 1. With reference to the drawings, and particularly FIGS. 1 and 2, the heat-exchanging apparatus has flexible, hollow tube 15 shaped in a helical fashion, adapted to fit around a media-containing vessel 1. One embodiment of the flexible, hollow tube 15 is a hollow, coil-like material with a specific diameter as desired by one of ordinary skill in the art. This size of flexible, hollow tube 15 can vary in diameter, depending on the size of media-containing vessel 1.

Another embodiment of flexible, hollow tube 15 can be flexible, hollow tube with a square 20, rectangular 21 or triangular 47 cross-section. Other geometric shapes as known to those of ordinary skill in the art are also contemplated by the instant invention as well.

Yet, another embodiment of the flexible, hollow tube, which may be of any cross-sectional shape (such as a square, rectangle, or circle), is placed inside heat-exchanging fluid filled cavity 16 known by one of ordinary skill in the art. The fluid-filled cavity contains the flexible, hollow tube within its membrane 17 while the inner surface of the fluid cavity is in contact with the media-containing vessel. This provides better surface area contact between the media-containing vessel and all sides of the coil as mediated by the fluid-filled cavity, thereby, allowing better heat exchange between the two structures. To further optimize heat transfer, the flexible, hollow tube may be wrapped around the media-containing vessel, in a helical pattern 15, 16 as many times as possible; the greater the number of revolutions around the media-containing vessel, the greater the surface contact between the inner wall of the media-containing vessel and the flexible, hollow tube. Thus, the greater the surface contact, the greater the heat transfer rate between the flexible, hollow tube and the media-containing vessel. The fluid-filled cavity's outer wall is insulated to prevent undesirable heat exchange with the air around it.

Another embodiment for the flexible, hollow tube may encompass a heating means in situ 43 with the flexible, hollow tube. This heating means can further aid the regulation of fluid temperature within the diametric walls of the flexible, hollow tube.

Figure 5:
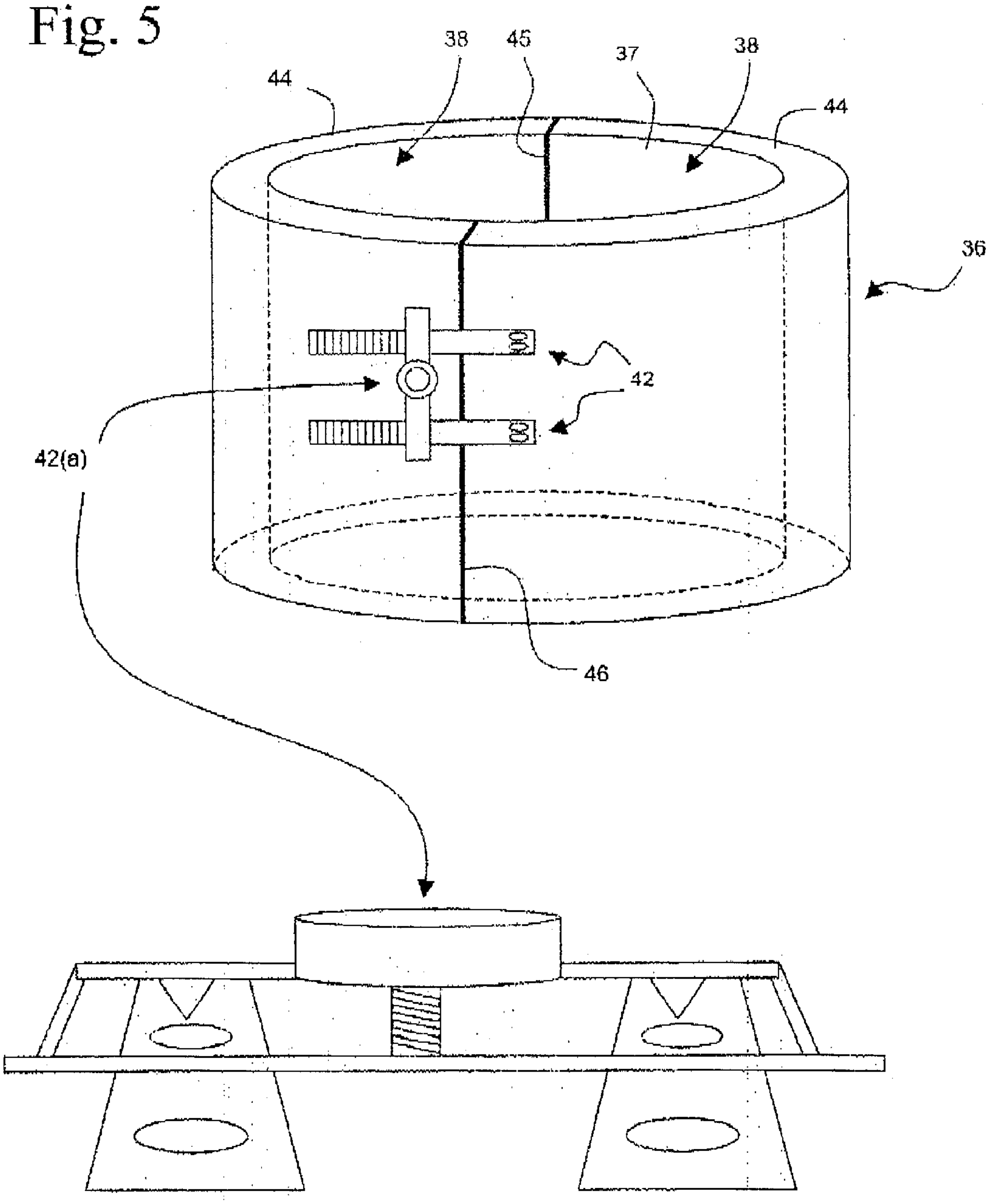
FIG. 5 is a front elevation view of a preferred embodiment that includes a flexible cavity and a quick-release spring lock that surrounds a media-containing vessel.
Figure 6:
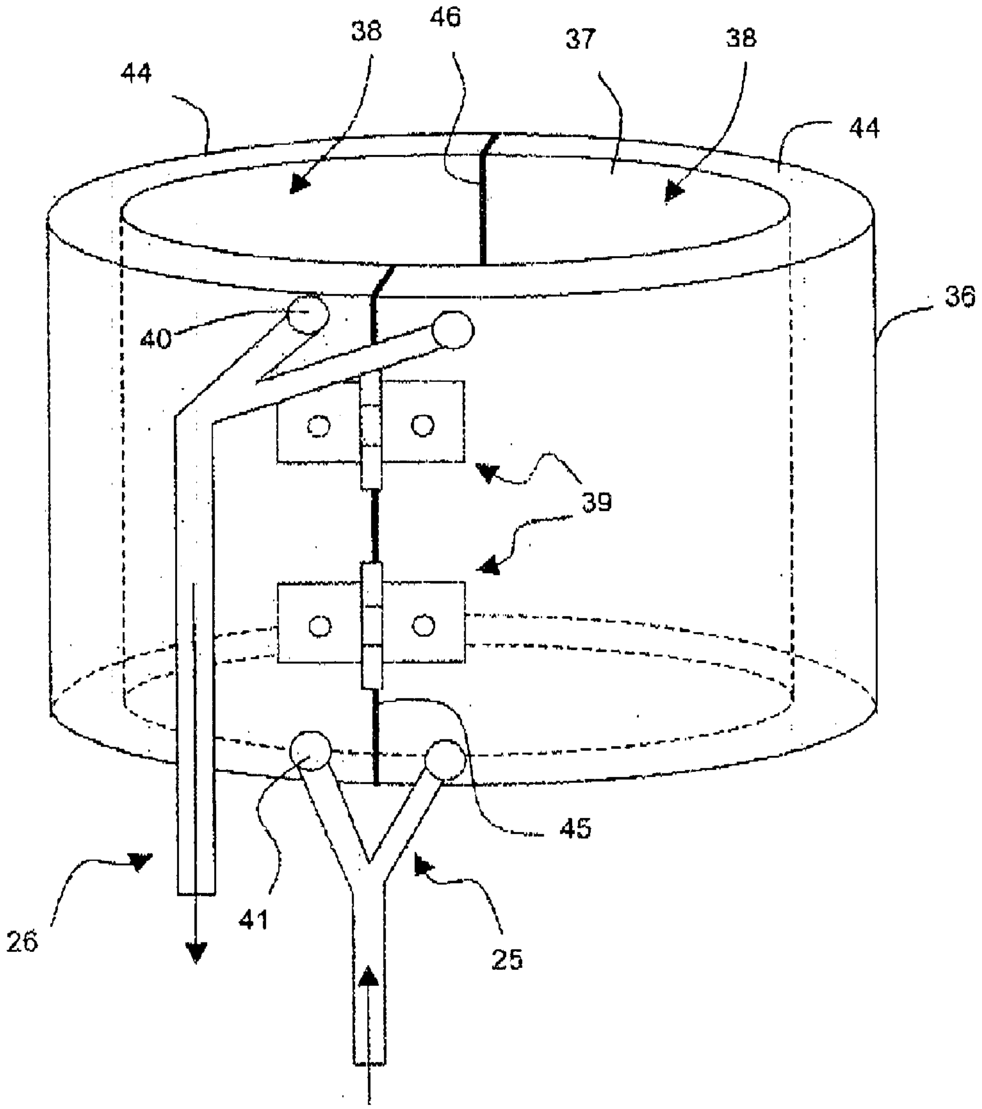
FIG. 6 is a rear elevation view of FIG. 5, which includes hinges and the flexible, heat-insulating tubes.

Another embodiment can replace the flexible, hollow tube that surrounds the media-containing vessel. As shown in FIGS. 5 and 6, two flexible fluid containing devices 44, each having first end 45 and second end 46, composed of outer wall 36 and inner wall 37 are attached by clasping means 39 at the first end 45. The outer and inner walls of the flexible fluid containing devices form hollow cavity 38 that encompasses fluid therein. The second ends of the flexible fluid containing devices are joined together by locking means 42. The locking means is adjusted by quick release spring lock 42*a* to allow for easily expanding or contracting the diameter of the flexible fluid containing devices.

The flexible fluid containing devices 36 are fitted around a media-containing vessel to encourage the heat-transfer process between inner wall 37 of the flexible fluid containing device and the outer wall of the media-containing vessel. Each first end 45 of the flexible fluid containing devices have two openings 40, 41 to allow the flexible heat-insulating tubes to attach to them. The flexible, heat-insulating tube 25 that introduces cool or hot fluid into the flexible fluid containing device is removeably connecting to lower opening 41 located at the bottom of the flexible fluid containing device's first end. The flexible, heat-insulating tube that removes the cool or hot fluid from the flexible fluid containing device is removeably connecting to upper opening 40 located at the top of the flexible fluid containing device's first end.

Thus, as fluid is introduced through the flexible fluid containing device's lower opening 41, air is displaced and fluid is exited out of the flexible fluid containing device's upper opening 40 via the flexible, heat-insulating tube 26. This flexible fluid-containing device allows for the maximum surface area contact with an outer wall of media-containing vessel. Therefore, the heat-exchange rate is maximized. Furthermore, this flexible fluid-containing device can adapt to many shapes that match various media-containing vessels known to one of ordinary skill in the art.

The inner wall of media-containing vessel 22 and the inner wall of flexible, hollow tube 20 are connected by a flexible, he at-exchanging mesh-like material 23 which provides a gripping means to allow for secure handling or transporting of the media-containing vessel. The flexible, heat-exchanging mesh-like material 23 can be attached to the inner wall of the flexible, hollow tube 20 via securable conventional clasping means 24.

As stated above, the purpose of the present invention is to achieve rapid counter-current thermal equalization of a media-containing vessel while providing a means for handling or transporting the media-containing vessel in a safe and effective manner.

The first end of the flexible, hollow tube 6 is attached to one flexible, heat-insulating tube 25 via a connecting means (discussed below). The flexible, heat-insulating tube 25 is attached to fluid-dispensing device 27 (preferably with one hot and one cold fluid dispenser, i.e. faucet) via adapting means 28. The fluid-dispenser should provide both hot and cold fluid to allow for a spectrum of fluid temperatures. The second end of flexible, hollow tube 7 should not be connected to a fluid-dispenser. Instead, it should be directed towards a fluid reservoir where fluid can exit after it travels through the flexible, hollow tube that is fit in a helical pattern around the media-containing vessel. As an alternate embodiment, the flexible, heat-insulating tubes may be connected to other heat-insulating tubes via an adapting means to allow for extended ranges of motion of the media-containing vessel while the flexible, heat-insulating tubes are connected to the fluid dispenser.

The first end of the flexible, hollow tube 6serves as a handle to grasp when squeezing, releasing, and handling-transporting the media-containing vessel. Insulated-gripping means 29 covers the handle to prevent the handler from coming into direct contact with the flexible, hollow tube while it is too hot or cold. Insulated handle 7 (flexible, hollow tube's first end) has locking means 6 attached to it and the second end of the flexible, hollow tube to allow for a secure and consistent grip of the media-containing vessel. Many conventional locking means available may be adapted to the present invention and are considered within the scope of the ordinary skill in the art.

As the flexible, hollow tube is fit in a helical pattern around the circumference of the media-containing vessel, either with or without a heat-exchanging fluid-filled cavity, handle 6 (first end of the flexible, hollow tube) and second end of the flexible hollow tube 7, can be squeezed and released to create a gripping force around the media-containing vessel. Because the flexible, hollow tube is fit in a helical pattern around the media-containing vessel, it has a natural resiliency. Thus, in its released state, the flexible, hollow tube fits snuggly around the media-containing vessel to allow for handling or transporting the media-containing vessel. Conversely, if the first and second end of the flexible, hollow tube are squeezed, the helical shape of the flexible, hollow tube will expand and allow the media-containing vessel to be removed from the flexible, hollow tube. Also, the handle (first end of the flexible, hollow tube), allows the handler to adjust and fit the flexible, hollow tube around the circumference of the media-containing vessel.

Figure 3:
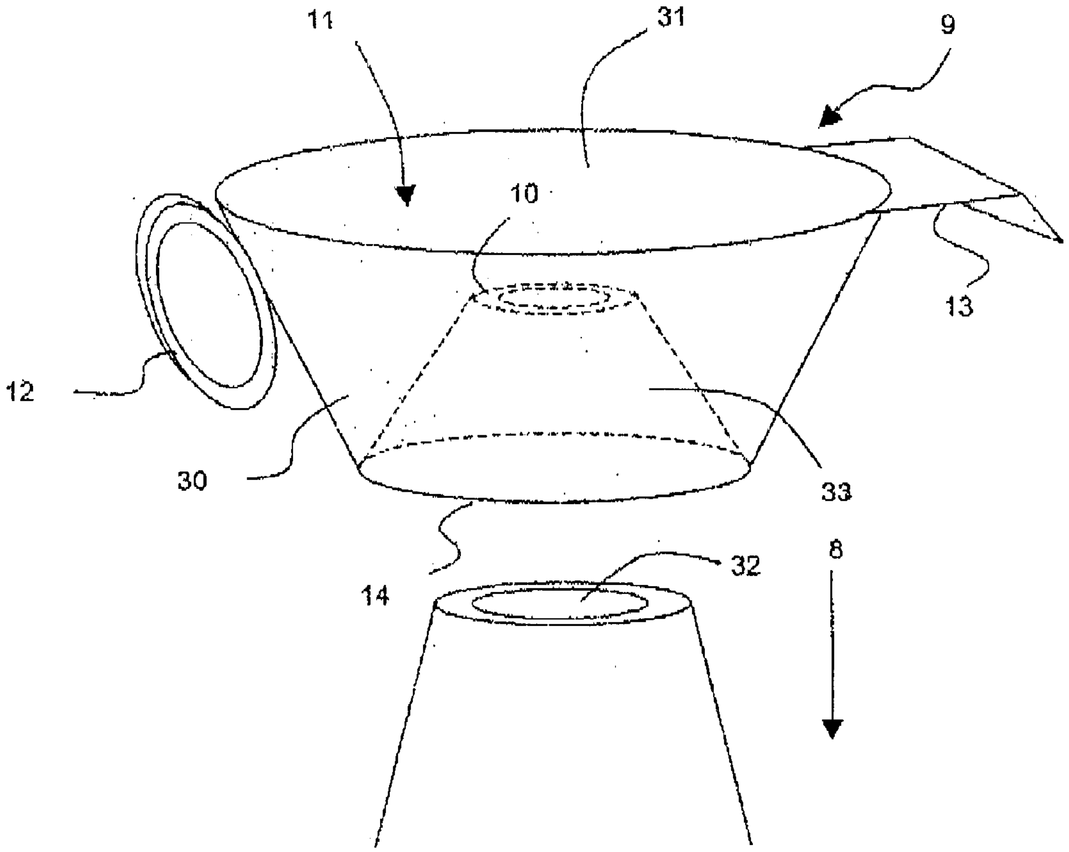
FIG. 3 is a front elevation view of the boil-shield.

In yet another embodiment, as shown in FIG. 3, boil-shield 30 can be added to the present invention to act as an overflow recovery reservoir. The inner walls of boil-shield 30 rise from bottom planar surface 14 to create inner container 11. Top 31 of the boil-shield is open and has a larger diameter than boil-shield's bottom planar surface 14, which has a diameter that is larger than the diameter of the top opening of the media-containing vessel 32. Inside the boil-shield is cone-like structure 33, which extends from bottom surface 74 of the boil-shield to approximately the mid-way between the bottom surface and top surface 10 of the boil-shield. The cone-like structure is hollow, exposing the base of the cone-like structure, which is located parallel to the boil-shield's bottom planar surface 74, to the top opening of media-containing vessel 32. This creates a channel that allows boil-over media to pass and settle in the boil-shield's inner container 11. The base of the cone-like structure has a larger diameter than its top to allow for a snug fit over the circular, top opening of media-containing vessel 32. At the top opening of the cone-like structure is silicon seal 10 which comes into contact with the top opening of the media-containing vessel 32 to prevent overflowing fluid from leaking through inner container 11 of the boil-shield. Removal and pouring handle 72 in the shape of a ring is attached to the top edge of boil-shield's outer circumference (side walls) 9 that is diametrically opposite to the pouring handle.

Figure 4:
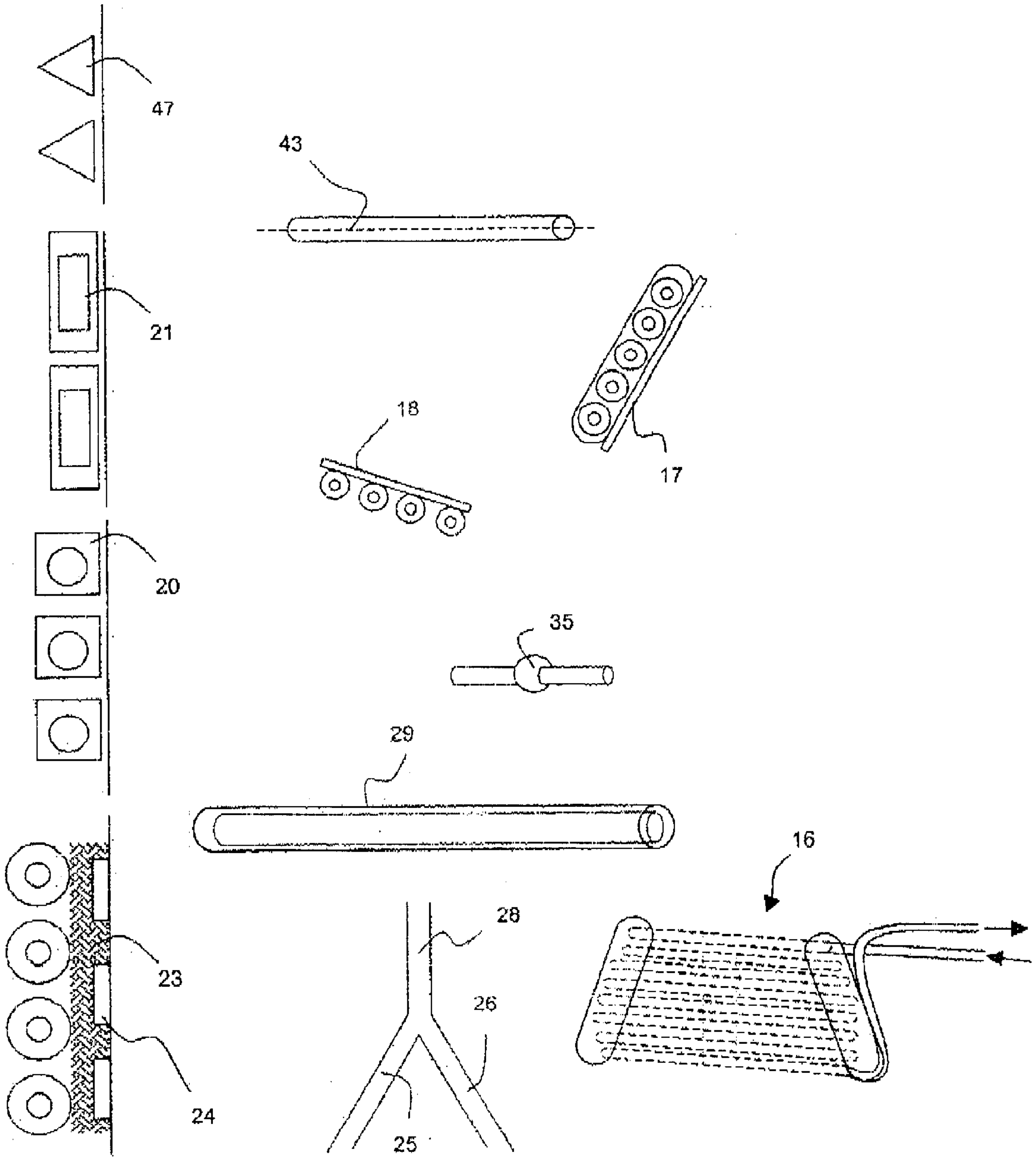
FIG. 4 is a cross-section view at line 4—4 of a preferred embodiment of the heat-exchanging device.

As shown in FIGS. 2 and 4, the number of revolutions flexible, hollow tube 15, 16 is wrapped around the media-containing vessel is not static. The number of revolutions the flexible, hollow tube orbits the media-containing vessel can vary, depending on the conventional size and thickness of media-containing vessel 1. By simply squeezing insulated gripping handle 6 against the second end of flexible, hollow tube 7, the present invention may be slipped over the base of media-containing vessel 34. Release of the handle allows for a quick and secure fit around the outer wall of the media-containing vessel.

As clockwise spinning of the solution within the vessel is initiated, via heat/stir plate 4, heat vectors 3 to and through the outer walls of the media-containing vessel and are rapidly and efficiently absorbed via cooler fluid passing in a counter-current fashion through flexible, hollow tube 15, 76, which surrounds the outer wall of the media-containing vessel in a helical pattern. The result is rapid, even, and efficient even thermo-stabilization. The same process occurs for heating the solution inside a media-containing vessel. However, for heating the solution in the media-containing vessel, the fluid traveling through the flexible, hollow tube must have a higher temperature relative to the temperature of the solution inside the media-containing vessel.

As stated above, by turning on heat/stir plate 4, the handler initiates a clockwise mixing of the hot solution located within inner walls 22 of the media-containing vessel. This mixing directionally vectors 3 heat energy to and through the outer wall of the media-containing vessel. An alternative embodiment allows an inexpensive contact strip thermometer to attach on the outer wall of the media-containing vessel for temperature monitoring. Because the flexible, hollow tube is configured to pass cooler incoming water, which originates from a renewable supply (such as a sink adjusted to the desired temperature) 27, directionally through the device in a manner opposite the directional flow of the hot solution (i.e. counter-clockwise), the result is a rapid equalization in temperature as the heat energy is drawn off with the outgoing flow passing out via the second end of the flexible, hollow tube 7.

In another preferred embodiment, the use of quick-release line attachments equipped with one-way ball valves 35 in the insulated handle allows for easy tubing detachment and insulated handle durability and unrestricted mobility, since the one-way valves prevent leaking between disconnecting and reattaching the flexible, hollow tube and the flexible, heat-insulating tubes.

Once temperature equilibrium has been achieved, a continuous low-rate water flow that is adjusted to a desired temperature in conjunction with continued mixing perpetuates a stable and uniform solution temperature without having to resort to an expensive and bulky water bath (which does not allow for mixing), or the unpredictability of heat/stir plate's 4 heating element (most heat/stir plates do not note the set temperature of its dial). Moreover, the present invention can be used to "jump start" the preparation of fresh media. By simply passing hot water through flexible, hollow tube 15, the cool deionized water used to make media is rapidly heated through the media-containing vessel's outer wall 1. In addition, even if boil over occurs, the boil-shield collection reservoir (as shown in FIG. 3) prevents media from boiling over the hot plate. Furthermore, the boil-shield recovers any boiled-over media, which can be important when later amending media to a desired concentration (as one needs to factor in the volume of solution).

As shown in FIG. 2, the present invention quickly, simply, and securely slips on and off media-containing vessels with a simple squeeze of first 6 and second 7 end of the flexible, hollow tube. When insulated handle 6(first end of the flexible, hollow tube) is released, flexible, hollow tube 15 springs back to its original shape. By this quick-release means of springing back, the media-containing vessel is securely gripped at its widest circumference. This allows the handler to pick up and transport hot or cold flasks from, or alternately, to the heat/stir plate without directly touching the outer wall of the media-containing vessel.

Figure 7:
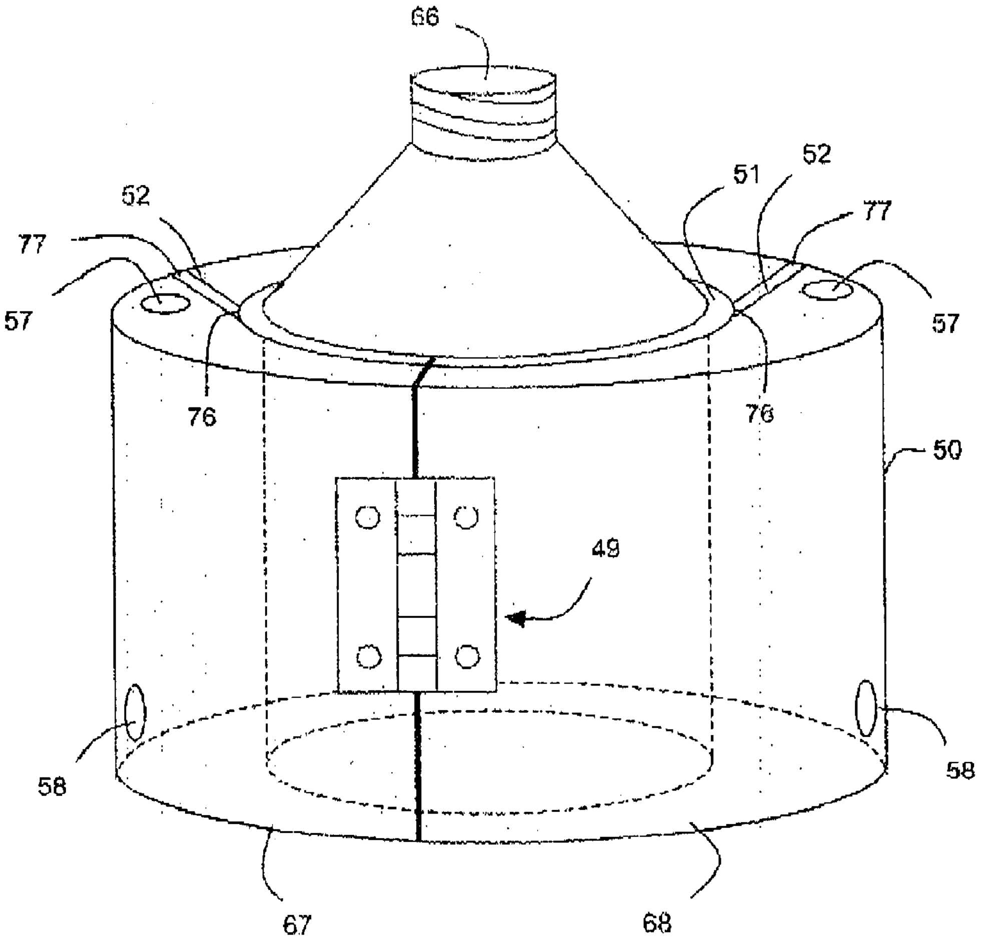
FIG. 7 is a rear elevation view, of an embodiment that includes a heat-exchanging cavity, which allows for maximum surface are in contact with a cylindrical device, and a handle.
Figure 8:
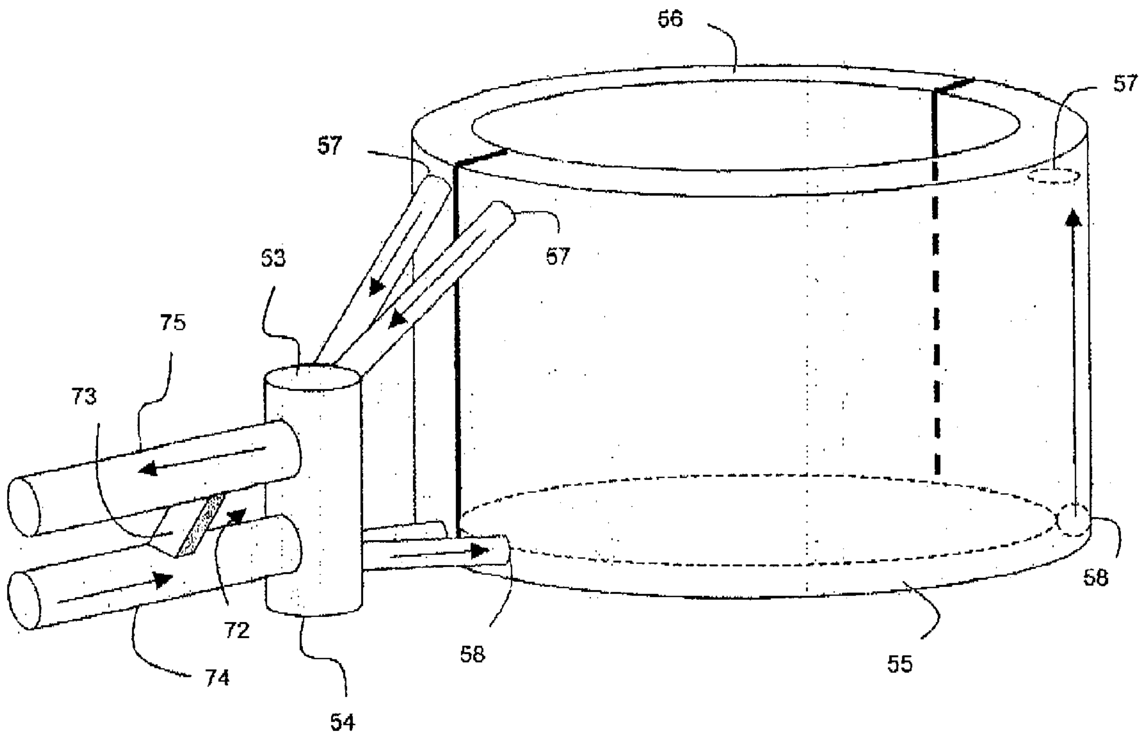
FIG. 8 is an offset front elevation view of FIG. 7 showing the handle in a detailed view.
Figure 9:
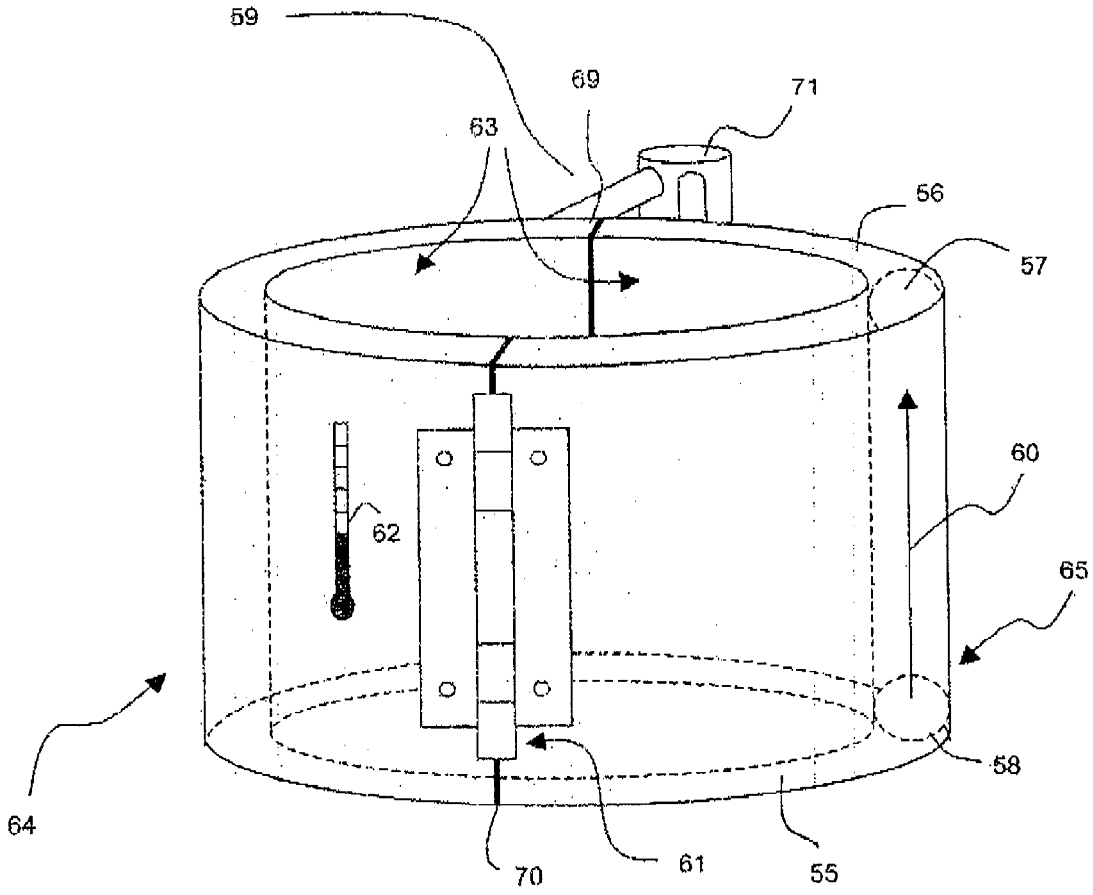
FIG. 9 is a rear elevation view of FIG. 8 showing a chamber thermometer and a connecting means.

An alternative embodiment FIGS. 7, 8, 9 of the invention allows for the heating or cooling and handling or transporting of cylindrical-shaped vessels 66, rather than conical-shaped vessels. Cylindrical shaped vessels 66 possess a flayed upper lip and pour spout, which interfere with the attachment of the other embodiments. This embodiment illustrated in FIGS. 7, 8, 9 is designed to circumvent this problem to allow for concurrent thermo-regulation and transportation of beakers and other similarly cylindrical-shaped vessels 66. This embodiment allows for the maximum amount of surface area contact between the cylindrical-shaped vessels and two heat-insulating cavities 67, 68.

This embodiment consists of heat-exchanging cavities 67, 68, each with first end 69 and second end 70. First end 69 is attached by handle 77, which is used to grip cylindrical-shaped vessel 66 and contains latching means 73 for securing handle 77 in locked position 72. Handle 71 contains heat-insulated first 53 and second 54 handle cavities to allow for the flow of in-current 74 and out-current 75 fluid, respectively. First handle cavity 53 is located in the upper portion of handle 71, which provides a channel for out-current 75 fluid flow. Second handle cavity 54 is located in the lower portion of handle 71, which provides a channel for in-current 74 fluid flow.

First 53 and second 54 heat-insulated handle cavities are mutually exclusive and do not allow in-current 74 and out-current 75 fluids to mix together. Heat-conducting membrane 63 covers the inner wall of heat-exchanging cavities 67, 68. Chamber thermometer 62 is attached, via a connecting means, to either first 67 or second 68 heat-exchanging cavity. Outer walls 64 of first 67 and second 68 heat-exchanging cavities are transparent and insulated to minimize the level of heat loss generated by fluid 58 inside the cavity. In-current 55 and ex-current 56 delivery lines evenly communicate the travel path of fluid 58throughout first 67 and second 68 heat-exchanging cavities.

Cold fluid 58 enters through first handle cavity 54, via the flexible heat-insulating tubes, and enters first 67 and second 68 heat-exchanging cavities via a series of lower openings 58. Lower openings 58 are diametrically opposed and located on in-current delivery line 55to allow for an even flow of in-current fluid 74. As in-current fluid 74 enters first and second heat-exchanging cavities 67, 68, both air 65 and warmed fluid 60 are displaced through a series of upper openings 57 on the out-current delivery line 56 to allow for an even flow of out-current fluid 75. In-current 55 and out-current 56 delivery lines communicate fluid throughout the circumference of heat-insulating cavities 67, 68.

Heat-insulating cavities 67, 68 further comprise flexible contact membrane 57 and rigid outer support wall 50. Two elastic drawstrings 52, each with first 76 end and second 77 end, help secure heat-insulating cavities 67, 68 surface contact with cylindrical-shaped vessels' 66 outer circumference. Elastic drawstrings' 52 first ends 76 are attached, via a connecting means, to out-current delivery line 56 located at diametrically opposing points. Elastic drawstrings' 52 second ends 77 are attached, via connecting means, to heat-exchanging cavities' 67, 68 outer walls 50 at diametrically opposed ends. Second end 70 of heat-exchanging cavities 67, 68 are attached to each other by connecting means 49.

Although certain preferred embodiments of the present invention have been described, the spirit and scope of the invention is by no means restricted to what is described above. For example, the number of helical revolutions 15 around a media-containing vessel may vary or the thickness of the heat-exchanging mesh-like material 23 may vary.

Figure 10:
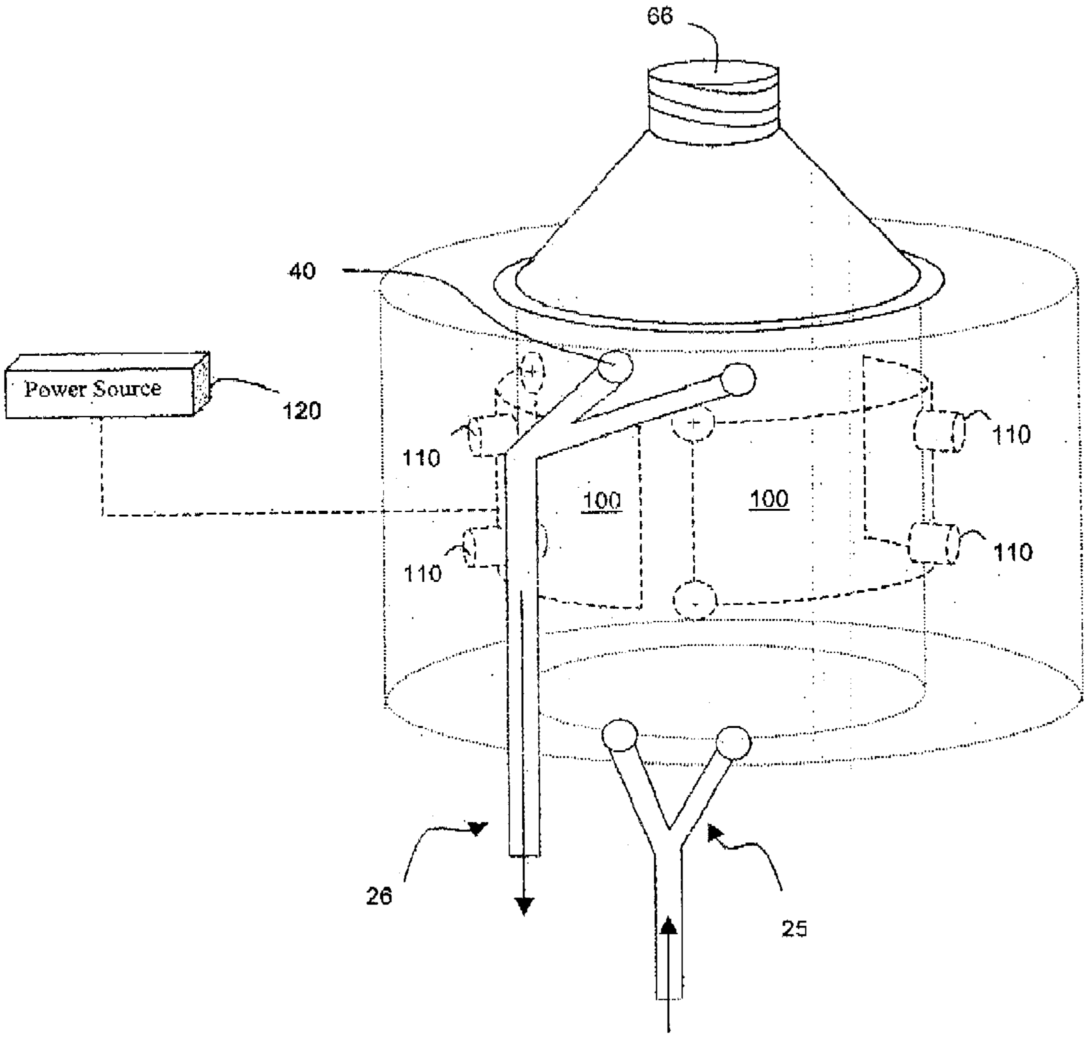
FIG. 10 is a partially sectional isometric view of an embodiment of the invention utilizing Peltier thermoelectric contact panels.

FIG. 10 shows an embodiment of the invention employing substantially waterproof Peltier thermoelectric contact panels 100 coincident to vessel 66 for heating and cooling vessel 66 by reversing the polarity of power source 120. Preferably, contact panels 100 are biased against vessel 66 by springs 110.

Having thus described the invention, the construction, the operation and use of the preferred embodiments thereof, and the advantageous new and useful results obtained thereby, the new and useful constructions, and reasonable mechanical equivalents thereof, as obvious to those of ordinary skill in the art, the constructions are set forth in the appended claims.

What is claimed is:

1. A vessel handler comprising:

a flexible, hollow tube generally in the shape of a coil defining a first end and a second end, the flexible hollow tube to surround a vessel;

two flexible, heat-insulating tubes with a first end and a second end, affixed to the flexible, hollow tube forming an integrated handle wherein movement of the two flexible tubes to a first position securely engages the vessel and movement of the two flexible tubes to a second position releases the vessel from the coiled hollow tube.

2. The handler of claim 1, further comprising insulating means attached to the heat-insulating tubes.

3. The handler of claim 1, further comprising at least two one-way ball valves, each ball valve fluidly disposed between first and second ends of flexible, hollow tube and the flexible, heat-insulating tubes.

4. The handler of claim 1, further comprising a flexible, mesh-like heat-exchanging material, with a means for securing the inner wall of flexible, hollow tube to the flexible, mesh-like heat-exchanging material.

5. The handler of claim 1, wherein the flexible, heat-insulating tubes further comprises a fastening means in cooperation with the first end and second end of flexible, hollow tube.

6. The handler of claim 1, further comprising:

a heat-exchanging fluid-filled cavity; and a flexible, hollow tube with a first end, a second end, and an inner body that is suspended within the heat-exchanging fluid filled cavity, the flexible, hollow tube situated in a helical pattern within the heat-exchanging fluid-filled cavity having at least two access opening points to define a first end and a second end to allow material to enter and exit the heat-exchanging fluid-filled cavity.

7. The handler of claim 1, wherein the flexible, hollow tube is further comprised of a heating means in situ with the flexible, hollow tube.

8. The handler of claim 1, wherein the flexible, hollow tube has a rectangular cross-section.

9. The handler of claim 1, wherein the flexible, hollow tube has a triangular cross-section.

10. The handler of claim 1, further comprising a thermometer; the thermometer being removeably coupled to the media-containing vessel.

11. The handler of claim 1, farther comprising a boil-shield removeably set on top of a media-containing vessel's opening.

12. The handler of claim 11, wherein the boil-shield further comprises: an outer wall, a pouring spout, and a ring handle; the pouring spout and the ring handle being attached to the boil-shield's outer wall at diametrically opposite ends.

13. The handler of claim 11, wherein the boil-shield further comprises a silicon seal sandwiched between the boil-shield and media-containing vessel.

14. The handler of claim 11, further comprising an overflow guard and support handle attached to the flexible, hollow tube surrounding the media-containing vessel.

15. The handler of claim 1 further comprising, a locking means that is connected around the flexible, hollow tube's outer walls locate proximal to the flexible, hollow tube's first and second ends, the locking means adapted to maintain the heat-insulating tubes at a fixed relationship to each other.

16. The handler of claim 1, further comprising a fluid reservoir in fluid communication with the first end of at least one flexible heat-insulating tube, the fluid reservoir to provide thermal regulating fluid to the flexible hollow tube.

17. A vessel handler comprising:

two flexible fluid containing devices generally in the shape of a cylinder defining a first end and a second end, an inner wall and an outer wall, a hollow cavity situated in between the inner wall and the outer wall, and a lower opening and an upper opening located at the flexible fluid containing devices' first ends; the lower opening is located at a vertical distance below the upper opening not to exceed the height of the flexible fluid containing devices;

two flexible, heat-insulating tubes with a first end and a second end, affixed to the flexible fluid containing devices' first ends forming an integrated handle wherein movement of the two flexible tubes to a first position securely engages the vessel and movement of the two flexible tubes to a second position releases the vessel from the coiled hollow tube;

a connecting means adapted to the flexible fluid containing devices' lower and upper opening and the flexible, heat-insulating tubes.

18. The handler of claim 14, further comprising a flexible, mesh-like heat-exchanging material, with a means for securing the inner wall of flexible fluid containing devices to the flexible, mesh-like heat-exchanging material.

19. The handler of claim 14, further comprising a boil-shield that is removeably situated on top of media-containing vessel's opening.

20. The handler of claim 14, wherein the flexible fluid containing devices hollow cavities have a cross-section between 1 centimeter and 15 centimeters from the flexible fluid-containing devices' inner wall and outer wall.

21. The handler of claim 17, wherein the cross-section has a width that is greater than 15 centimeters.

22. The handler of claim 14, further comprising a thermometer; the thermometer being removably attached to the media-containing vessel.

23. The handler in claim 16, wherein The boil-shield further comprises: an outer wall, a pouring spout, and a ring handle; the pouring spout and the ring handle being attached to the boil-shield's outer wall at diametrically opposite ends.

24. The handler in claim 16, wherein the boil-shield further comprises a silicon seal; the silicon seal is situated around the top circumference of a cone-like structure connected with an inner cavity of the boil-shield.

25. The handler of claim 14, further comprising an overflow guard and support handle; the overflow guard and pouring handle being attached to the flexible, hollow tube surrounding the media-containing vessel.

26. The handler of claim 17 further comprising, a locking means connected around the flexible fluid containing devices' second ends, the locking means allows for easily adjusting the shape of the flexible fluid containing devices and securing the flexible fluid containing devices in a fixed relationship to each other.

27. The handler of claim 17, further comprising a fluid reservoir in fluid communication with the first end of at least one flexible heat-insulating tube, the fluid reservoir to provide thermal regulating fluid to the two flexible fluid containing devices.

28. A handler comprising:

two heat-exchanging cavities, the cavities have a first end and a second end, the cavities have a bottom wall and an upper wall, and the cavities have an inner wall and an outer wall;

a heat-insulating handle connectively coupled to at least one of said first ends of said heat-exchanging cavities, the handle has an upper cavity and a lower cavity, the upper cavity and the lower cavity are mutually exclusive;

an in-current delivery line, positioned substantially within said lower cavity of said heat-insulating handle;

an out-current delivery line, positioned substantially within said upper cavity of said heat-insulating handle.

29. The handler in claim 28, further comprising a thermometer, which is attached, via a connected means, inside of either heat-exchanging cavity.

30. The handler in claim 28, wherein the first ends of the heat-exchanging cavities are removeably attached, via a connecting means.

31. The handler in claim 28, wherein the second ends of the heat-exchanging cavities are removeably attached by the heat-insulated handle.

32. The handler in claim 28, wherein the heat-insulating cavities are securably connected to the in-current delivery line at the bottom wall and to the out-current delivery line at the bottom wall and to the out-current delivery line at the upper wall.

33. The handler in claim 28, wherein both the in-current delivery line and the out-cutrent delivery line have openings to allow fluid to evenly pass through from the in-current delivery line to the heat-exchanging cavities and from the heat-exchanging cavity to the out-current delivery line.

34. The handler in claim 28, wherein the outer wall is insulated and the inner wall is coated with a heating-exchanging material.

35. The handler in claim 28, wherein the lower handle cavity provides a channel for in-current fluid to pass through to the in-current delivery line and the upper handle cavity provides a channel for out-current fluid to pass through from the out-current delivery line.

36. The handler in claim 28, wherein the heat-insulated handler can be maintained into a secure position via a locking means.

37. The handler in claim 28, further comprising two elastic drawstrings, the drawstrings have a first and a second end.

38. The handler in claim 28, wherein the drawstrings' first ends are removeably connected to the heat-exchanging cavities outer wall, via a connecting means.

* * * * *